US010536609B2

(12) United States Patent
Schramek et al.

(10) Patent No.: US 10,536,609 B2
(45) Date of Patent: Jan. 14, 2020

(54) METHOD OF COMPENSATING FOR PRINTING SUBSTRATE DEFORMATION IN MULTICOLOR DUPLEX PRINTING

(71) Applicant: HEIDELBERGER DRUCKMASCHINEN AG, Heidelberg (DE)

(72) Inventors: Edmund Schramek, Sinsheim (DE); Hans-Peter Schmitt, Neckargemuend (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/251,892

(22) Filed: Jan. 18, 2019

(65) Prior Publication Data

US 2019/0230249 A1    Jul. 25, 2019

(30) Foreign Application Priority Data

Jan. 23, 2018  (DE) .......... 10 2018 200 994

(51) Int. Cl.
*H04N 1/409*  (2006.01)
*H04N 1/32*  (2006.01)

(52) U.S. Cl.
CPC ....... *H04N 1/4095* (2013.01); *H04N 1/32219* (2013.01)

(58) Field of Classification Search
CPC .......... H04N 1/4095; H04N 1/32219
See application file for complete search history.

(56) References Cited

U.S. PATENT DOCUMENTS

| 8,570,606 B2 | 10/2013 | Baeumler |
| 10,121,097 B2 | 11/2018 | Gembe et al. |
| 2010/0225932 A1 | 9/2010 | Kurose et al. |
| 2011/0236092 A1* | 9/2011 | Kanai ............... G03G 15/2053 399/331 |
| 2011/0279513 A1 | 11/2011 | Mizes et al. |

FOREIGN PATENT DOCUMENTS

| DE | 10344237 A1 | 4/2005 |
| DE | 102009051197 A1 | 5/2011 |
| DE | 102014013370 A1 | 3/2016 |
| DE | 102015219245 B3 | 11/2016 |

OTHER PUBLICATIONS

IP.com search (Year: 2019).*

* cited by examiner

*Primary Examiner* — Lisa Solomon
(74) *Attorney, Agent, or Firm* — Laurence A. Greenberg; Werner H. Stemer; Ralph E. Locher

(57) ABSTRACT

A method for compensating for printing substrate deformation in a multicolor duplex printing operation by way of a computer. The substrate deformation that arises when individual color separations are printed onto the first and second sides of the printing substrate in the printing units is established and compensated for in the course of an automated register correction process. The computer calculates a forecast of the substrate deformation on a basis of the established first side deformation parameters of the printing substrate. When further color separations are printed onto the second side the forecast is used as an input parameter for a compensation of the substrate deformation of the second side.

8 Claims, 3 Drawing Sheets

METHOD OF COMPENSATING FOR PRINTING SUBSTRATE DEFORMATION IN MULTICOLOR DUPLEX PRINTING

CROSS-REFERENCE TO RELATED APPLICATION

This application claims the priority, under 35 U.S.C. § 119, of German patent application DE 10 2018 200 994.5, filed Jan. 23, 2018; the prior application is herewith incorporated by reference in its entirety.

BACKGROUND OF THE INVENTION

Field of the Invention

The invention lies in the field of industrial printing technology. More particularly, the present invention relates to a method for compensating for printing substrate deformations in a multicolor duplex printing operation to achieve first side to second side register.

In industrial printing operations, various types of printing substrate deformations occur in the printing substrate. In general, these deformations include substrate expansion (fan-out) or substrate shrinking. They cause various problems in the printing operation, among them above all register deviations between the individual color separations because the individual color separations may not be printed on top of one another in register due to the substrate deformations. In terms of substrate format, this applies to sheet-fed printing and web-fed printing. In terms of the printing process, fan-out is a well-known phenomenon in lithographic offset printing, for instance. Fan-out refers to the fact that among other factors, the pressure generated by the application of the printing plates to the printing substrate in the course of the printing operation continuously causes the printing substrate to expand. The result is a slight continuous trapezoidal expansion of the printed printing substrate in the printing direction. If this substrate expansion is ignored in the case of multicolor printing, subsequent color separations are applied to the expanded substrate and will therefore be no longer in register relative to the previous color separations that have already been printed. Register errors are the result. Thus in accordance with the prior art, the expansion that occurs in the substrate is measured downstream of every printing unit to obtain data on the extent of the substrate expansion. These data are then used to create print data that have been adapted in a corresponding way and to create new printing plates. In an ideal case, the occurring substrate expansion may be calculated in advance to provide printing plates for subsequent color separations that have been adapted in a way to avoid register errors right from the start.

U.S. Pat. No. 10,121,097 B2 and its counterpart German Patent DE 10 2015 219 245 B3, for instance, disclose a method for efficient fan-out control in lithographic offset printing machines. There, the occurring register deviations of all color separations are measured to find the color separation with the greatest register deviation, which is generally the first color separation because the first color separation causes the largest expansion of the substrate. Due to the fact that only this color separation is compensated for, the document discloses a particularly efficient and resource-saving way of compensating for fan-out.

The printing substrate expansion problem also occurs in inkjet printing. In inkjet printing, there are even two known major influences that act on the geometry of the printing substrate. On the one hand, the substrate is likewise known to expand slightly in inkjet printing; in this case, the slight expansion is due to the application of the ink, which in most cases contains water. On the other hand, the substrate is known to shrink; the extent of this shrinkage phenomenon has an even greater influence on the substrate than the substrate expansion caused by water-based ink. The substrate shrinkage phenomenon is due to the fact that ink-jet printing operations using water-based ink require the use of a dryer that dehydrates the ink to allow the printed substrate to be further processed. However, it is not only the ink that is dehydrated but also the printing substrate, a process that results in a visible shrinkage of the printing substrate. This shrinkage likewise needs to be compensated for in a corresponding way.

German published patent application DE 10 2014 013 370 A1, for instance, discloses a method for compensating for local register deviations in an inkjet printing machine wherein a mathematical model is used to calculate geometric deviations of color separations in an inkjet printing process. The influencing factors of the model, in particular process and material parameters, are determined and the geometric deviations that occur due to substrate expansion and/or shrinkage are calculated. Then the individual color separations for the inkjet printing process are modified in such a way that the calculated geometric deviations of the printing substrate are compensated for in a corresponding way.

The known methods for compensating for printing substrate expansions that occur in inkjet printing differ from the ones used in offset printing in terms of the process parameters that need to be taken into account and inasmuch as in offset printing, the printing plates need to be adapted whereas in inkjet printing, it is possible directly to adjust the image to be printed, which is available in digital form. However, the underlying problem is the same. In both cases, register deviations will occur due to substrate expansion or shrinkage and in both cases the image that is still available in digital form needs to be modified before the printing operation can take place.

As far as substrate expansion and shrinkage are concerned, however, there is another problematic aspect that has not been addressed in the prior art so far, neither in lithographic printing nor in inkjet printing. This aspect is rooted in what is known as duplex printing, i.e. when the front and back sides of the printing substrate are to be printed on. In accordance with the prior art, a method for compensating for substrate expansion that is suitable for the field of application is applied independently to the first side and to the second side. However, this approach ignores the fact that the expansion of the substrate that occurred when the first side of the printing substrate was printed on is still present when the second side of the printing substrate is printed on, especially if there is only a short period between printing on the first side and printing on the second side. Thus any substrate deformation that occurs when the first side of the printing substrate receives the print will also influence the print on the second side. However, the method of the prior art that has been known so far does not include sufficient steps to address this problem. The prior art method only factors in the substrate deformation that occurs when the second side is printed on, which means the overall result of the compensation for substrate deformation is not optimal.

SUMMARY OF THE INVENTION

It is accordingly an object of the invention to provide a method for first side to second side registration which overcomes the above-mentioned and other disadvantages of the heretofore-known devices and methods of this general type and which provides for compensating for printing substrate deformations that occur in duplex printing.

With the foregoing and other objects in view there is provided; in accordance with the invention, a method of compensating for printing substrate deformation in a multicolor duplex printing operation with a plurality of printing units in a printing machine, the method comprising:

printing individual color separations onto a first side of a printing substrate;

in the course of an automated register correction process with a computer, measuring register marks printed in a previous printing unit with at least one image sensor in a respectively following printing unit to establish deformation parameters of the first side of the printing substrate;

compensating for the substrate deformations based on the established deformation parameters of the first side of the printing substrate;

calculating with a computer a substrate deformation of a last printing unit that prints on the first side based on the established substrate deformation values of the previous printing units; and calculating with a computer a forecast for a substrate deformation that will occur when further color separations are printed onto the second side, including a parameter representing the deformation of the last printing unit on the first side, and using the forecast as an input parameter for a compensation of the substrate deformation of the second side.

In other words, the objects of the invention are attained by a method for compensating for printing substrate deformation in a multicolor duplex printing operation by means of a computer. The substrate deformation that arises when individual color separations are printed onto the first and second sides in the printing units is determined and compensated for in the course of an automated register correction process. Based on the determined first side deformation parameters of the printing substrate, the computer calculates a forecast of the substrate deformation that will occur when further color separations are printed onto the second side and uses the forecast as an input parameter for a compensation of the substrate deformation of the second side. Thus the main aspect of the invention is that based on the substrate deformation parameters in the form of substrate expansion or substrate shrinkage parameters that have been established using methods known from the prior art, the substrate deformation occurring when the first side is printed on is calculated or established. Then the method for compensating for substrate deformation on the second side is adapted in such a way that the substrate deformation that has occurred when the first side was printed on is used as an input parameter for the process of compensating for substrate deformation on the second side. In this context, the questions whether the printing substrate is a sheet or a web and whether the printing process is sheet-fed or web-fed printing are irrelevant for the method of the invention.

In accordance with an added feature of the invention, the substrate deformation caused by every printing unit is detected in the respective following printing unit by means of an image sensor that measures register marks, wherein the substrate deformation of the last printing unit that is used on the first side is used as an input parameter for a compensation of the substrate deformation on the second side and is calculated on the basis of the established substrate deformation values of the previous printing units. When the total substrate deformation that occurs when the first side is printed on is established, an important aspect is that the substrate deformation that is caused by every color separation may logically not be established until after the color separation has been printed in the respective printing unit. This means that the substrate deformation that is caused by the application of the last color separation in the last printing unit cannot be detected by the methods of the prior art because once the last printing unit has applied the print, no analysis of the resultant substrate deformation is carried out because the known methods of the prior art only refer to simplex printing where no more adaptation of a further color separation is required once the print in the last printing unit has been completed. Thus in the method of the invention, determining the total substrate deformation includes determining the substrate deformation that is caused by the application of the last color separation in the last printing unit. Since there is no expedient measurement for this because usually in duplex printing the printing substrate has already been turned and prepared for receiving a print on the second side after the application of the last color separation or, in the case of inkjet printing, after the drying process, the substrate deformation caused by the last printing unit needs to be calculated. This is usually done on the basis of the established, known substrate deformation values of the previous printing units. They may be used to derive certain rules for the development of the substrate deformation form printing unit to printing unit, which may then be used to calculate the substrate deformation after the last printing unit.

In accordance with an additional feature of the invention, the calculation of the substrate deformation of the last printing unit that is used on the first side is done by extrapolating the established substrate deformation of the previous printing units. The calculation of the substrate deformation values after the last printing unit is preferably done by extrapolating the established substrate deformation that occurred in the upstream printing units. In this process, a mathematical approach is applied to create a rule in the form of a value curve for the substrate deformation of the previous printing units on the basis of the development of the substrate deformation of the previous printing units. This value curve is continued, i.e. extrapolated for the last printing unit that prints the last color separation.

In accordance with another feature of the invention, for extrapolation purposes, the register deviations caused by the established substrate deformation in the previous printing units is converted to a standardized area coverage, which is then set off against the actual area coverage values of the color separation in the last printing unit. To be able to make a correct extrapolation, the established substrate deformation of the previous printing units needs to be converted to a standardized area coverage of the applied ink. This standardized area coverage for the values of the previous printing units, for which the development of the substrate deformation over the previous printing units is thus known, may be set off against the known area coverage values that are achieved in the last printing unit for the last color separation in order to calculate the substrate deformation that is caused by the last printing unit.

In accordance with a further feature of the invention, when the input parameter for the compensation for the substrate deformation on the second side is calculated, the way in which the printing substrate is turned, namely turning along the length and turning along the width, are factored in. Apart from a pure calculation of the input parameter of the substrate expansion caused by the prints on the first side of the printing substrate, it is also important whether the way in which the printing substrate is turned to receive a print on the second side of the printing substrate is taken into consideration. A further portion of the input parameters that are used in accordance with the method of the invention for compensating for the substrate deformations on the second side is added to the turning type, which may be reversal along the length of the print sheet or reversal along the width of the print sheet.

In accordance with a preferred feature of the invention, when the printing substrate is pre-treated, any substrate deformation that is caused by the pre-treatment is calculated and used as an input parameter for the calculation of the substrate deformation of the first side in the course of the printing operation. The method of the invention may also be applied in a case in which the printing has been pre-treated and a substrate deformation has occurred as a result of the pre-treatment. In such a case, in accordance with the invention, the substrate deformation that is caused by the pre-treatment of the printing substrate is determined and provided as an input parameter to the process of calculating the compensation of the substrate deformation caused by the prints on the first side.

A further preferred further development of the method of the invention in this context is that the pre-treatment of the printing substrate is a hot-foil stamp and/or the application of a foil to the printing substrate. Both types of pre-treatment (hot-foil stamping and foil application) cause different substrate deformations, which means that the type of pre-treatment needs to be known to be able to determine the substrate deformation caused by the pre-treatment as accurately as possible. The pre-treatment may include the application of a specific primer if it was needed and had not been applied to the printing substrate when the printing substrate was produced.

In accordance with a concomitant feature of the invention, in the case of an offset printing operation, the substrate deformation is a substrate expansion and in the case of an inkjet printing process, the substrate deformation is substrate shrinkage. Accordingly, this means that substrate deformation may refer to both substrate expansion and substrate shrinkage. As explained in the introduction, the main problem that occurs in lithographic offset printing operations is substrate expansion due to the fan-out phenomenon, whereas in inkjet printing, although a slight substrate expansion may occur, the main problem is substrate shrinkage, especially when the use of a drier is required due to the use of water-based ink.

Other features which are considered as characteristic for the invention are set forth in the appended claims.

Although the invention is illustrated and described herein as embodied in a first side to second side register method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

In the drawings, mutually corresponding elements have the same reference symbols.

DETAILED DESCRIPTION OF THE INVENTION

Figure 1:
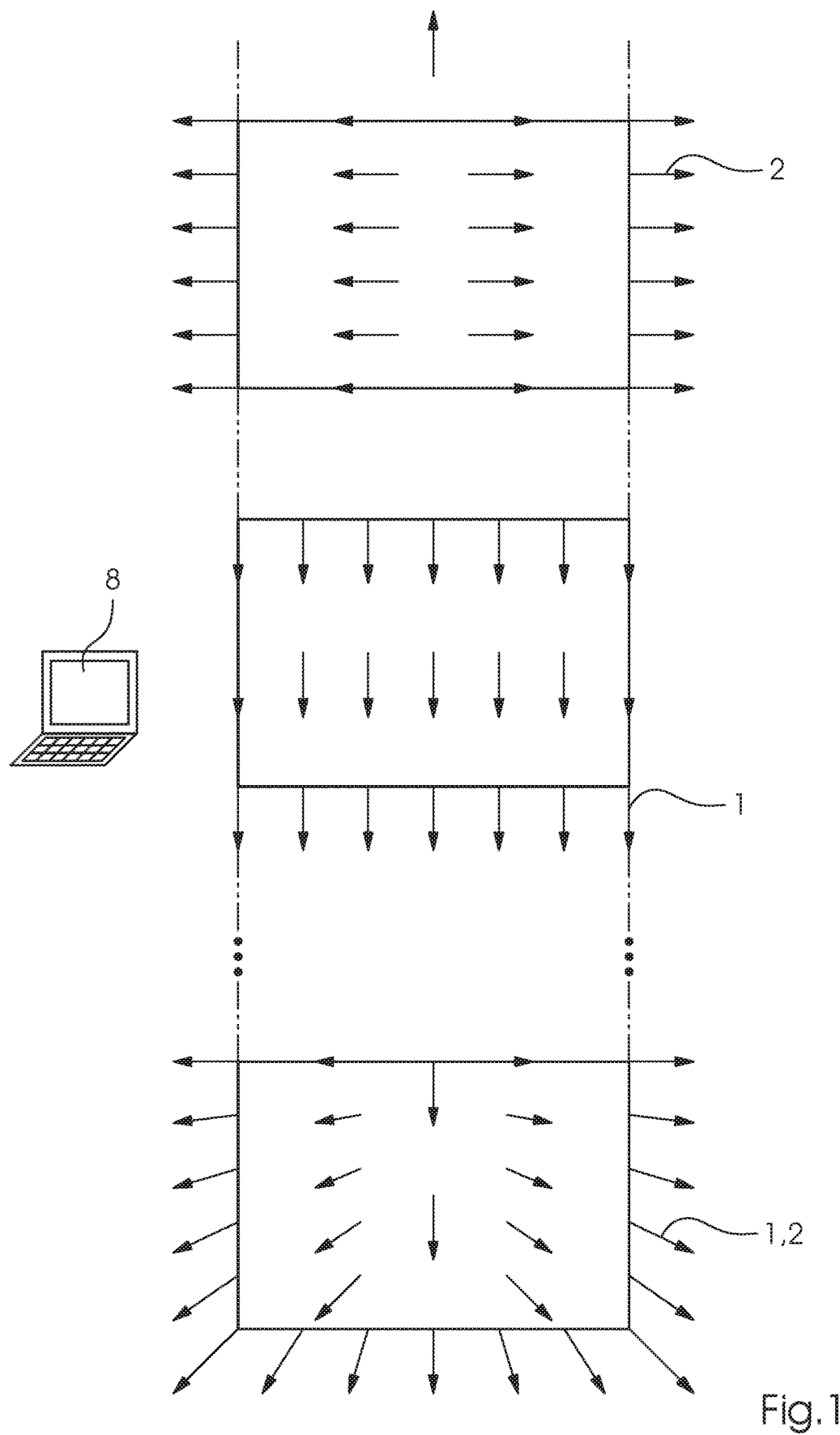
FIG. 1 is a schematic representation of the fan-out phenomenon.
Figure 2:
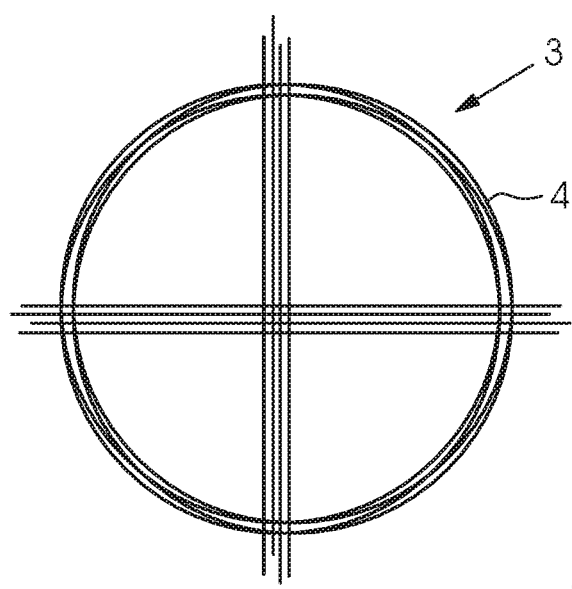
FIG. 2 illustrates the result of a local register deviation.

Referring now to the figures of the drawing in detail and first, particularly, to FIGS. 1 and 2 thereof, register deviations 4 that occur in a printing operation and need to be compensated for are mainly caused by paper deformations. They are schematically shown in FIG. 2 in the form of a register cross 3 that is used to measure the accuracy of the placement of the different color separations relative to one another. The example shown in FIG. 2 clearly shows the deviations 4 of the individual color separations that occur when there are local register deviations. The fact that these local register inaccuracies may be caused by process-inherent deformations of the printing materials is shown in FIG. 1, which illustrates an example of how paper may expand due to the fan-out phenomenon. FIG. 1 clearly shows the deforming forces 2 that occur in a direction perpendicular to the printing direction and the deforming forces 1 that occur along the printing direction. However, since the deformation forces influence one another, as a result, there are deformations in all directions 1 and 2. These deformations 1 and 2 need to be factored in to obtain high-quality prints. For this purpose, a prior art method for paper expansion compensation for simplex printing operations may be carried out by a control unit 8.

Figure 3:
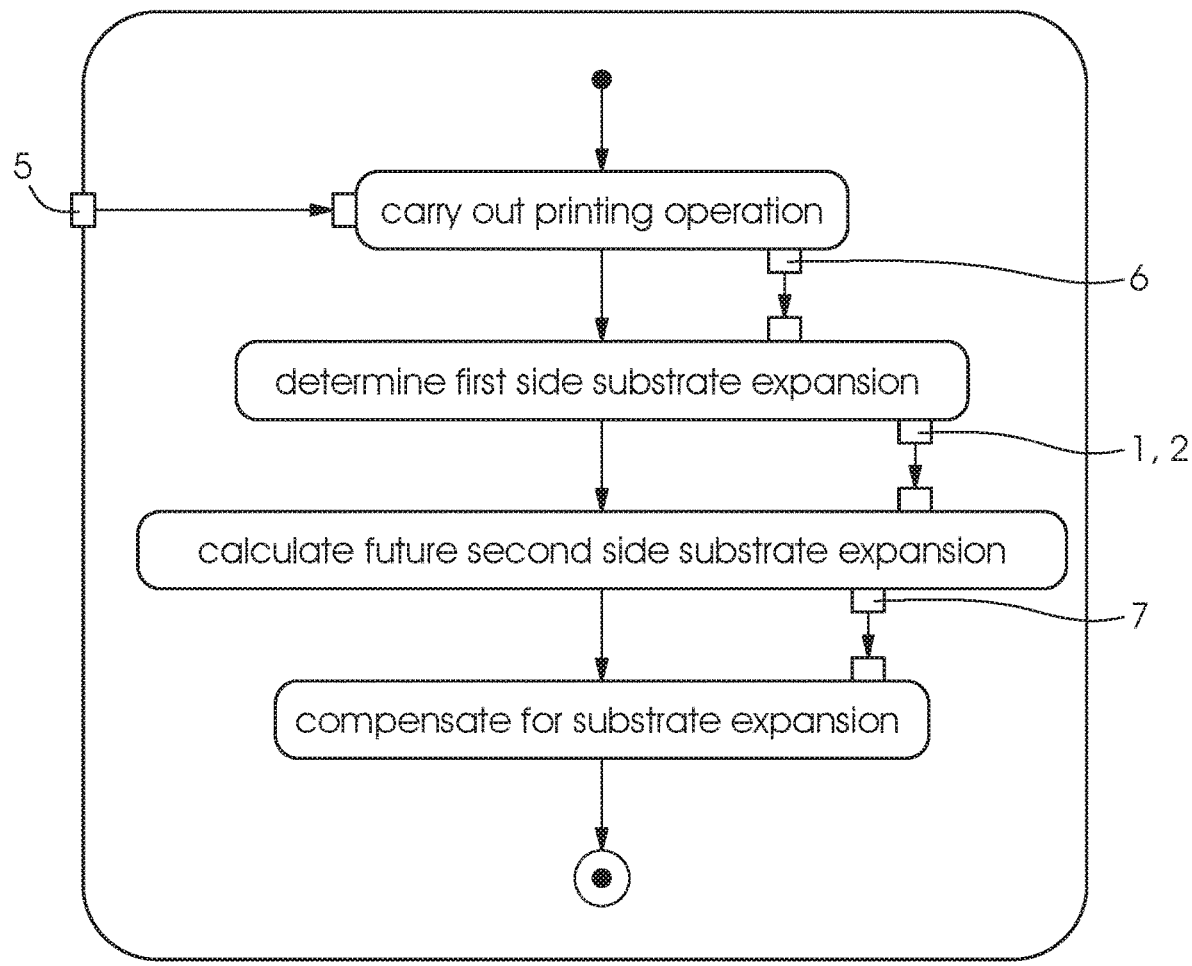
FIG. 3 is a schematic flow chart of the method according to the invention.

FIG. 3 schematically illustrates a preferred exemplary embodiment of the method of the invention for compensating for paper deformations that occur in duplex printing. The preferred embodiment will be explained in more detail below based on an example of a multicolor sheet-fed lithographic offset printing operation. In this case, the printed printing substrate is a print sheet 6. Naturally, the first step is to complete the printing operation on the first side. In this process, a number of printing units print the print image data in the form of individual color separations coming from the print preparation department 5. The expansion of a printed print sheet 6 occurs when the sheet 6 leaves the printing unit. The result is a register deviation 4 between two units as a measure of the expansion of the sheet caused by the previous printing unit. By way of example, the following section assumes a standard color sequence B, C, M, Y for a four-color printing operation.

B=black is the color of reference. An example of a set of measurements (in mm) is

| printing unit | register deviation in the circumferential direction |
|---|---|
| C | −0.1 |
| M | −0.2 |
| Y | −0.3 |

The black printing unit has thus elongated the paper by 0.1 mm, the cyan printing unit by 0.2 mm, etc.

The longitudinal expansion caused by Y cannot be determined by register measurements because Y is the last color separation. However, printing experiments have shown that the printing units behave approximately alike. To minimize constructional tolerances, an average of the previous units may be assumed as the longitudinal expansion 1 of the last printing unit, which results from the following formulas:

$$\Delta l(n) = \Delta l(n) - \Delta l(n-1)$$

—establishes the contribution by an individual unit n.

$$\Delta \ln = \frac{1}{n-1} \sum_{0}^{n-1} \Delta l(n)$$

—is an estimated expansion in the last printing unit.

$$\Delta Lges = \frac{1}{n-1} \sum_{0}^{n-1} \Delta l(n) + \sum_{0}^{n-1} \Delta l(n)$$

—is the total expansion 1 of the sheet 6.

This analogously applies to the expansion in a lateral direction 2: ΔBges

In this way, the offset relative to an undeformed sheet may be determined for every point 4 whose register deviation is known:

$$P\begin{pmatrix} x1 \\ y1 \end{pmatrix} = P\begin{pmatrix} x0 \\ y0 \end{pmatrix} + \begin{pmatrix} \Delta Bges \\ \Delta Lges \end{pmatrix}$$

Then, depending on the type of the printing operation, the image on the second side needs to be pre-distorted by a starting value 7. In this context, the type of the printing operation above all refers to the way in which the sheet 6 is turned.

Depending on the printing system, the sheet 6 may be turned along its length or along its width. When the sheet is turned along its width, the value of the left-hand upper corner of the first side needs to be assumed as the pre-distortion for the upper right-hand corner of the image. When the sheet is turned along the length, the lower right-hand corner needs to be adapted in a corresponding way.

Thus the transformation rule for any point $$P\begin{pmatrix} xB \\ yB \end{pmatrix}$$

on the second side of the sheet is $$P\begin{pmatrix} xB \\ yB \end{pmatrix} = P\begin{pmatrix} xB \\ yB \end{pmatrix} + \begin{pmatrix} \Delta Bges \\ \Delta Lges \end{pmatrix} * \begin{pmatrix} 0 \\ -1 \end{pmatrix} \text{ turning along the width}$$

$$P\begin{pmatrix} xB \\ yB \end{pmatrix} = P\begin{pmatrix} xB \\ yB \end{pmatrix} + \begin{pmatrix} \Delta Bges \\ \Delta Lges \end{pmatrix} * \begin{pmatrix} -1 \\ 0 \end{pmatrix} \text{ turning along the length}$$

This model may be used to establish the starting parameters 7 for a compensation of printing substrate deformations that occur when the second side of the sheet 6 is printed on. The substrate deformations 1, 2 that have occurred when the first side received the print may thus be taken into consideration for a compensation process when the second side receives a print. The invention thus represents a significant improvement in terms of the efficiency of the compensation for duplex printing.

The following is a summary list of reference numerals and the corresponding structure used in the above description of the invention:

1 substrate expansion along the printing direction
2 substrate expansion perpendicular to the printing direction
3 register cross
4 register cross in the case of deviated color separations
5 image data from the print preparation department
6 printed printing substrate
7 starting parameters for second side substrate expansion
8 computer

The invention claimed is:

1. A method for compensating for printing substrate deformation in a multicolor duplex printing operation with a plurality of printing units in a printing machine, the method comprising:
   printing individual color separations onto a first side of a printing substrate;
   in a course of an automated register correction process, measuring register marks printed in a previous printing unit with at least one image sensor in a respectively following printing unit to establish deformation parameters of the first side of the printing substrate;
   compensating for the substrate deformations based on the established deformation parameters of the first side of the printing substrate;
   calculating with a computer a substrate deformation of a last printing unit that prints on the first side based on the established substrate deformation values of the previous printing units; and
   calculating with a computer a forecast for a substrate deformation that will occur when further color separations are printed onto the second side, including a parameter representing the deformation of the last printing unit on the first side, and using the forecast as an input parameter for a compensation of the substrate deformation of the second side.

2. The method according to claim 1, wherein the step of calculating of the substrate deformation of the last printing unit printing on the first side by means of the computer is attained by extrapolating the substrate deformation that has been established for the previous printing units.

3. The method according to claim 2, which comprises, for extrapolating, converting the register deviations caused by the established substrate deformation of the previous printing units to a standardized area coverage, and setting off the standardized area coverage against actual area coverage values of the color separation in the last printing unit.

4. The method according to claim 1, which comprises, in a calculation of the input parameter for the compensation of the substrate deformation of the second side, factoring in a type of reversal of the printing substrate including reversal along a length and reversal along a width of the printing substrate.

5. The method according to claim 1, which comprises, when the printing substrate is a pre-treated substrate, calculating any substrate deformation that is caused by a pre-treatment and using as an input parameter for calculating the substrate deformation of the first side in the course of the printing operation.

6. The method according to claim 5, wherein the pre-treatment of the printing substrate is at least one of a hot-foil stamping operation and an application of a foil to the printing substrate.

7. The method according to claim 1, which comprises printing in an offset printing process and determining the substrate deformation as a substrate expansion.

8. The method according to claim 1, which comprises printing in an inkjet printing process and determining the substrate deformation as a substrate shrinkage.

* * * * *